United States Patent
Matsuo et al.

(10) Patent No.: US 11,981,261 B2
(45) Date of Patent: May 14, 2024

(54) VEHICLE PROJECTION CONTROL DEVICE, HEAD-UP DISPLAY DEVICE, VEHICLE PROJECTION CONTROL METHOD, AND PROGRAM

(71) Applicant: JVCKENWOOD Corporation, Yokohama (JP)

(72) Inventors: Kenichi Matsuo, Yokohama (JP); Makoto Kurihara, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 618 days.

(21) Appl. No.: 16/810,898

(22) Filed: Mar. 6, 2020

(65) Prior Publication Data

US 2020/0207272 A1    Jul. 2, 2020

Related U.S. Application Data

(63) Continuation of application No. PCT/JP2018/011908, filed on Mar. 23, 2018.

(30) Foreign Application Priority Data

Sep. 20, 2017  (JP) ................................. 2017-180750

(51) Int. Cl.
*B60R 1/00* (2022.01)
*G06T 11/00* (2006.01)

(52) U.S. Cl.
CPC ............... *B60R 1/00* (2013.01); *G06T 11/00* (2013.01); *B60R 2300/10* (2013.01); *B60R 2300/205* (2013.01); *B60R 2300/307* (2013.01)

(58) Field of Classification Search
None
See application file for complete search history.

(56) References Cited

U.S. PATENT DOCUMENTS

| | | | |
|---|---|---|---|
| 9,651,390 B1* | 5/2017 | Thompson | F21S 41/60 |
| 2013/0117025 A1* | 5/2013 | Park | G06F 3/167 |
| | | | 704/260 |

(Continued)

FOREIGN PATENT DOCUMENTS

| JP | 2000-275057 | 10/2000 |
|---|---|---|
| JP | 2003-254764 | 9/2003 |

(Continued)

OTHER PUBLICATIONS

International Search Report and Written Opinion for International Patent Application No. PCT/JP2018/011908 dated Jun. 26, 2018, 10 pages.

*Primary Examiner* — Aaron M Richer
(74) *Attorney, Agent, or Firm* — Amin, Turocy & Watson, LLP

(57) ABSTRACT

A vehicle projection control device includes: a vehicle information acquisition unit that acquires vehicle information including a vehicle speed of a vehicle; an identification information acquisition unit that acquires identification information identifying a tunnel through which the vehicle travels; a virtual vehicle video generation unit that generates a virtual moving body video of a virtual moving body that moves ahead of the vehicle in a direction that is the same as the vehicle, the virtual moving body video being for projection by a projection unit of a head-up display device; and a projection control unit that controls projection of the virtual moving body video, such that a virtual image of the generated virtual moving body video is visually recognized ahead of the vehicle with use of a projection unit. The projection control unit controls the projection of the virtual moving body video based on the acquired identification information.

7 Claims, 10 Drawing Sheets

(56) References Cited

U.S. PATENT DOCUMENTS

| | | | | |
|---|---|---|---|---|
| 2014/0362195 A1* | 12/2014 | Ng-Thow-Hing | ..... | G06V 40/20 |
| | | | | 348/51 |
| 2016/0129836 A1* | 5/2016 | Sugita | .................. | G01C 21/365 |
| | | | | 701/41 |
| 2018/0004020 A1* | 1/2018 | Kunii | .................... | G03B 21/562 |
| 2019/0317600 A1* | 10/2019 | White | ................ | G01C 21/3647 |

FOREIGN PATENT DOCUMENTS

| | | |
|---|---|---|
| JP | 2003-294474 | 10/2003 |
| JP | 2005-107918 | 4/2005 |
| JP | 2006-284195 | 10/2006 |
| JP | 2013-200218 | 10/2013 |

* cited by examiner

VEHICLE PROJECTION CONTROL DEVICE, HEAD-UP DISPLAY DEVICE, VEHICLE PROJECTION CONTROL METHOD, AND PROGRAM

CROSS-REFERENCE TO RELATED APPLICATION(S)

This application is a Continuation of PCT international application Ser. No. PCT/JP2018/011908 filed on Mar. 23, 2018 which designates the United States, incorporated herein by reference, and which claims the benefit of priority from Japanese Patent Application No. 2017-180750, filed on Sep. 20, 2017, incorporated herein by reference.

BACKGROUND

Technical Field

The present disclosure relates to a vehicle projection control device, a head-up display device, a vehicle projection control method, and a program.

Description of the Related Art

There are known head-up display devices, which project, as virtual images, information to be provided to a driver, directly in the driver's line of sight, the information being, for example, route guidance information or speed information. Known is a technique for guiding a vehicle by displaying an image of a leading virtual vehicle at a position that is on a windshield and where the leading virtual vehicle would be visible from the driver's viewpoint, the leading virtual vehicle traveling ahead of the vehicle by a predetermined distance on a guided route (as seen in, for example, JP-A-2000-275057). Known is a technique for displaying a virtual vehicle at a position ahead of a vehicle by a predetermined distance, the virtual vehicle instructing in action to be taken by the vehicle (as seen in, for example, JP-A-2003-254764).

For example, when visibility in tunnels is low and there are no preceding vehicles, traffic lanes and tunnel side walls are difficult to be recognized and driving in tunnels may thus be difficult. Furthermore, by the visibility being low in tunnels, a driver may get an oppressive feeling from tunnel side walls.

SUMMARY

A vehicle projection control device according to an embodiment includes a vehicle information acquisition unit, an identification information acquisition unit, a virtual moving body video generation unit, and a projection control unit. The vehicle information acquisition unit is configured to acquire vehicle information including a vehicle speed of a vehicle. The identification information acquisition unit is configured to acquire identification information identifying a tunnel through which the vehicle travels. The virtual moving body video generation unit is configured to generate a virtual moving body video of a virtual moving body that moves ahead of the vehicle in a direction that is the same as the vehicle. The virtual moving body video is for projection by a projection unit of a head-up display device. The projection control unit is configured to control projection of the virtual moving body video, such that a virtual image of the virtual moving body video generated by the virtual moving body video generation unit is visually recognized ahead of the vehicle with use of the projection unit of the head-up display device. The projection control unit is configured to control the projection of the virtual moving body video based on the identification information acquired by the identification information acquisition unit. The projection control unit is configured to control the projection of the virtual moving body video as if the virtual moving body is moving ahead of the vehicle at a speed of the vehicle immediately before the vehicle enters the tunnel.

A head-up display device according to an embodiment includes the vehicle projection control device described above and the projection unit.

A vehicle projection control method according to an embodiment includes: acquiring vehicle information including a vehicle speed of a vehicle; acquiring identification information identifying a tunnel through which the vehicle travels; generating a virtual moving body video of a virtual moving body that moves ahead of the vehicle in a direction that is the same as the vehicle, the virtual moving body video being for projection by a projection unit of a head-up display device; and controlling the projection of the virtual moving body video, such that a virtual image of the virtual moving body video generated at the generating the virtual moving body video is visually recognized ahead of the vehicle with use of the projection unit of the head-up display device. The controlling the projection of the virtual moving body video includes controlling the projection of the virtual moving body video based on the identification information acquired at the acquiring the identification information. The controlling the projection of the virtual moving body video includes controlling the projection of the virtual moving body video as if the virtual moving body is moving ahead of the vehicle at a speed of the vehicle immediately before the vehicle enters the tunnel.

A non-transitory computer-readable medium containing a program that causes a computer, which operates as a vehicle projection control device, to execute: acquiring vehicle information including a vehicle speed of a vehicle; acquiring identification information identifying a tunnel through which the vehicle travels; generating a virtual moving body video of a virtual moving body that moves ahead of the vehicle in a direction that is the same as the vehicle, the virtual moving body video being for projection by a projection unit of a head-up display device; and controlling the projection of the virtual moving body video, such that a virtual image of the virtual moving body video generated at the generating the virtual moving body video is visually recognized ahead of the vehicle with use of the projection unit of the head-up display device. The controlling the projection of the virtual moving body video includes controlling the projection of the virtual moving body video based on the identification information acquired at the acquiring the identification information. The controlling the projection of the virtual moving body video includes controlling the projection of the virtual moving body video as if the virtual moving body is moving ahead of the vehicle at a speed of the vehicle immediately before the vehicle enters the tunnel.

DETAILED DESCRIPTION

Described hereinafter in detail by reference to the appended drawings are embodiments of a vehicle projection control device, a head-up display device (hereinafter referred to as the "HUD device"), a vehicle projection control method, and a program, according to the present invention. The present invention is not limited by the following embodiments.

First Embodiment

Figure 1:
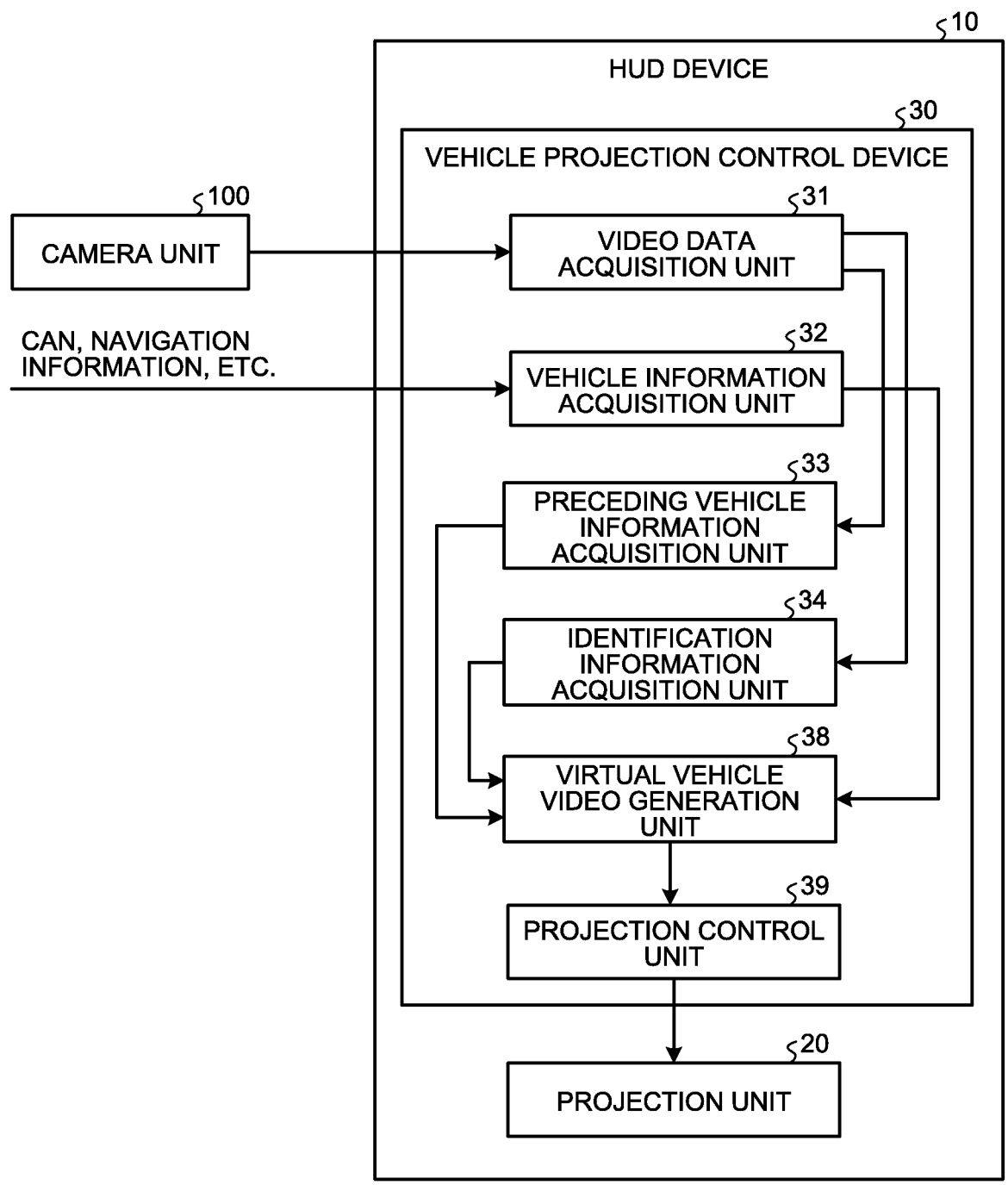
FIG. 1 is a block diagram illustrating an example of a configuration of a vehicle projection control device according to a first embodiment.
Figure 5:
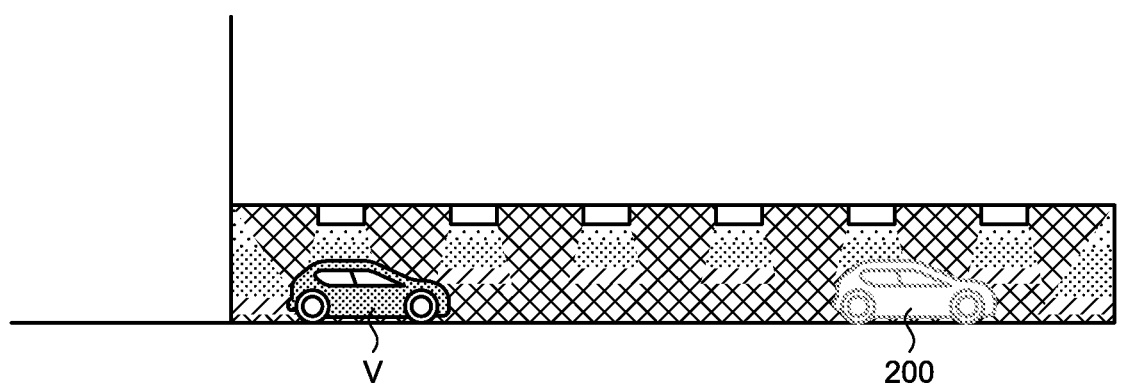
FIG. 5 is a diagram illustrating an example of the vehicle and a virtual image of a virtual vehicle video when the vehicle is traveling through the tunnel.

FIG. 1 is a block diagram illustrating an example of a configuration of a vehicle projection control device according to a first embodiment. According to a situation around a vehicle V thereof, an HUD device 10 performs control, such that a virtual moving body video is projected and a virtual image 200 (as seen in FIG. 5) of the virtual moving body video is visually recognized, with use of a vehicle projection control device 30. In this embodiment, when a tunnel T is present ahead of the vehicle V, the HUD device 10 performs control such that a virtual vehicle video is projected and a virtual image 200 of the virtual vehicle video is visually recognized, with use of the vehicle projection control device 30.

A camera unit 100 has a camera that captures an image around the vehicle V. Plural cameras may be provided therein. In this embodiment, the camera unit 100 has a front camera not illustrated in the drawings.

The front camera is a front video camera. The front camera is provided on a front portion of the vehicle V, and captures an image around the vehicle V, mainly in front of the vehicle V. Front video data are a moving image formed of, for example, images of 30 frames per second. The front camera outputs the front view data captured, to a video data acquisition unit 31 of the vehicle projection control device 30.

When the tunnel T is present ahead of the vehicle V, the HUD device 10 causes a virtual moving body video of a virtual moving body to be visually recognized as the virtual image 200, directly in the driver's line of sight. The virtual moving body video is a virtual vehicle video of a virtual vehicle that is a virtual preceding vehicle. The HUD device 10 has a projection unit 20, and the vehicle projection control device 30.

Figure 2:
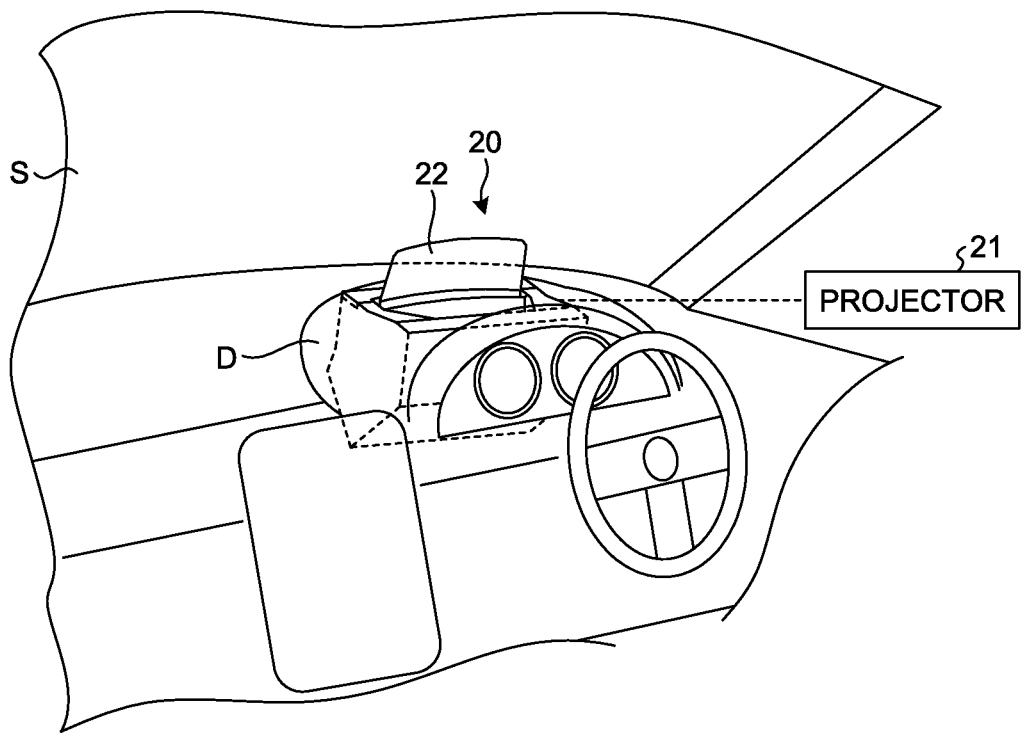
FIG. 2 is a diagram illustrating an example of a projection unit of a head-up display device according to the first embodiment.

The projection unit 20 will be described with reference to FIG. 2. FIG. 2 is a diagram illustrating an example of a projection unit of a head-up display device according to the first embodiment. The projection unit 20 includes a projector 21 and a combiner 22. The projection unit 20 causes a display video projected on the projector 21 to be reflected by the combiner 22, and visually recognized as a virtual image by the driver.

The projector 21 is, for example, a display including a liquid crystal display (LCD), or an organic electro-luminescence display. In this embodiment, the projector 21 is provided below a dashboard D. The projector 21 displays the display video on a display surface, based on a video signal from a projection control unit 39 of the vehicle projection control device 30. Video display light of the display video displayed on the display surface of the projector 21 is projected on the combiner 22.

The combiner 22 reflects the video display light projected from the projector 21, and causes the video display light reflected, to be recognized as the virtual image by the driver. The combiner 22 is a plate-like member provided convexly curved forward in an advancing direction. In this embodiment, the combiner 22 is provided above the dashboard D. The combiner 22 has a front surface facing a windshield S of the vehicle V and a rear surface facing the driver.

According to a situation around the vehicle V, the vehicle projection control device 30 performs control, such that the projector 21 of the projection unit 20 projects the display video. The vehicle projection control device 30 is an arithmetic processing device formed of, for example, a central processing unit (CPU). The vehicle projection control device 30 loads a program that has been stored in a storage unit not illustrated in the drawings, into a memory, and executes commands included in the program. The vehicle projection control device 30 has the video data acquisition unit 31, a vehicle information acquisition unit 32, a preceding vehicle information acquisition unit 33, an identification information acquisition unit 34, a virtual vehicle video generation unit (a virtual moving body video generation unit) 38, and the projection control unit 39. The vehicle projection control device 30 includes an internal memory not illustrated in the drawings, and the internal memory is used for temporarily storing therein data in the vehicle projection control device 30.

The video data acquisition unit 31 acquires peripheral video data obtained by capturing images around the vehicle V. More particularly, the video data acquisition unit 31 acquires video data output by the camera unit 100. The video data acquisition unit 31 outputs the video data acquired, to the preceding vehicle information acquisition unit 33 and the identification information acquisition unit 34.

The vehicle information acquisition unit 32 acquires vehicle information indicating a situation of the vehicle V, from a CAN, various sensors and the like that sense states of the vehicle V. The vehicle information acquisition unit 32 acquires, for example, vehicle speed information. The vehicle information acquisition unit 32 outputs the vehicle information acquired, to the virtual vehicle video generation unit 38. The vehicle information acquisition unit 32 stores the vehicle speed information acquired, into the internal memory.

The preceding vehicle information acquisition unit 33 acquires preceding vehicle information indicating presence or absence of a preceding vehicle that travels ahead of the traveling vehicle V. In this embodiment, the preceding vehicle information acquisition unit 33 determines whether or not a preceding vehicle is present in a range equal to or less than a first distance, by performing image processing on the video data acquired by the video data acquisition unit 31.

The first distance is preferably in a range of several tens of meters or more and about 200 meters or less. The first distance may be set according to a vehicle speed of the vehicle V. For example, the first distance may be a safe inter-vehicle distance set according to a vehicle speed of the vehicle V. Alternatively, for example, the first distance may be a distance longer than a safe inter-vehicle distance set according to a vehicle speed of the vehicle V. For example, on an expressway, when the vehicle V has a vehicle speed of 80 km/h, the first distance may be set to 80 meters, and when the vehicle V has a vehicle speed of 100 km/h, the first distance may be set to 100 meters. For example, on an expressway, when the vehicle V has a vehicle speed of 80 km/h, the first distance may be set to 100 meters, and when the vehicle V has a vehicle speed of 100 km/h, the first distance may be set to 200 meters.

Alternatively, the preceding vehicle information acquisition unit 33 may determine whether or not a preceding vehicle is present in a range equal to or less than the first distance, with use of a sensor unit not illustrated in the drawings, and acquire a result of the determination as the preceding vehicle information. The sensor unit is able to detect a preceding vehicle that is an obstacle ahead of the vehicle V. The sensor unit includes plural sensors installed around the vehicle V. These sensors are provided in front of the vehicle V, and detect a vehicle ahead of the vehicle V. The sensors may be, for example, infrared sensors, ultrasound sensors, or millimeter-wave radars, and may be formed of a combination of any of these sensors.

The identification information acquisition unit 34 acquires identification information identifying the tunnel T, which is to be traveled by the vehicle V, or in other words, is positioned ahead of the vehicle V. The identification information on the tunnel T includes, for example, a name identifying the tunnel T, an identification code identifying the tunnel T, or positional information.

In this embodiment, the identification information acquisition unit 34 is a character recognition unit, and recognizes characters included, as an object to be captured, in front video data captured by the camera unit 100. The identification information acquisition unit 34 acquires, as the identification information, a tunnel name from a character string formed of the characters recognized. The tunnel name is, for example, a character string, such as "XY Tunnel" (written in Japanese characters, katakana), "XY Tunnel" (written in Japanese characters, hiragana), "XY Tunnel" (written in English), or "XY Tunnel" (written in Japanese characters, kanji).

Figure 3:
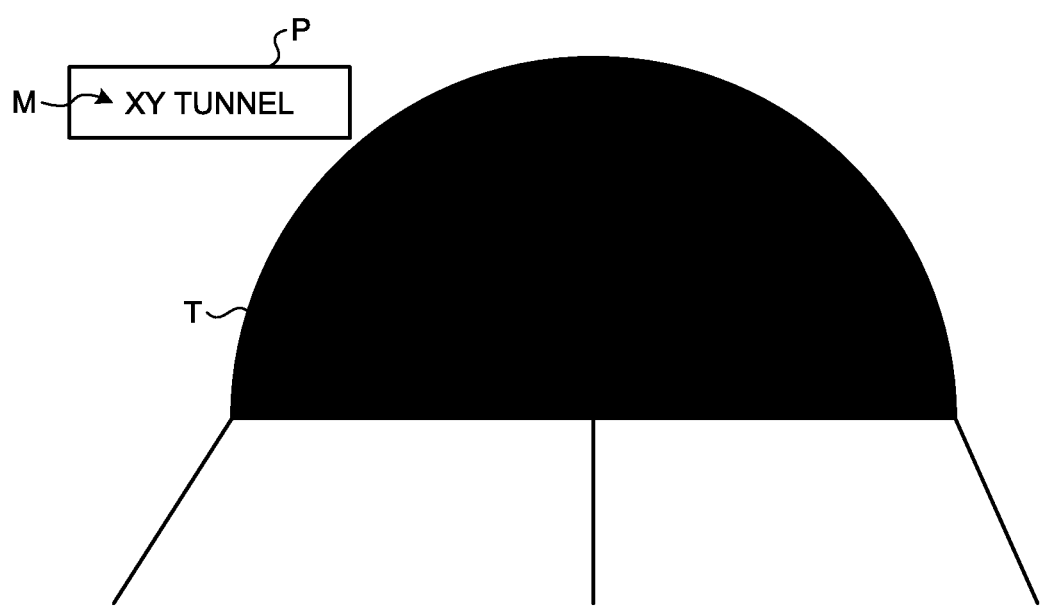
FIG. 3 is a diagram illustrating an example of an entrance of a tunnel.

Acquisition of a tunnel name will be described with reference to FIG. 3. FIG. 3 is a diagram illustrating an example of an entrance of a tunnel. Front video data obtained by capturing an entrance of the tunnel T have, displayed therein, a sign board P indicating a tunnel name. The identification information acquisition unit 34 acquires identification information that is a character string M, "XY Tunnel", from the front video data. The identification information acquisition unit 34 outputs the identification information recognized, to the virtual vehicle video generation unit 38.

The virtual vehicle video generation unit 38 generates a virtual vehicle video of a virtual vehicle that moves, ahead of the vehicle V, in the same direction as the vehicle V. The virtual vehicle video is for projection by the projection unit 20 of the HUD device 10. When the tunnel T is present ahead of the vehicle V, the virtual vehicle video generation unit 38 generates the virtual vehicle video. For example, the virtual vehicle video is a video, in which the vehicle V has been visually recognized from the back of the vehicle V.

In this embodiment, when the vehicle V enters the tunnel T, or, in other words, when the vehicle V travels through the tunnel T, the virtual vehicle video generation unit 38 generates the virtual vehicle video. In this case, when the identification information is acquired by the identification information acquisition unit 34, a distance from the vehicle V to the entrance of the tunnel T is calculated. Whether or not the vehicle V has entered the tunnel T may be determined based on a vehicle speed of the vehicle V.

In this embodiment, the virtual vehicle video is a video of a virtual vehicle that moves ahead of the vehicle V by the first distance. In this embodiment, the virtual vehicle video is a video, in which the vehicle V has been visually recognized from the back of the vehicle V. The virtual vehicle video is generated by changing a viewpoint according to a shape of a road ahead of the vehicle V by the first distance. For example, if the road ahead of the vehicle V by the first distance is curved rightward, the virtual vehicle video is a video, in which the vehicle V has been visually recognized from the right back of the vehicle V. For example, if the road ahead of the vehicle V by the first distance is curved leftward, the virtual vehicle video is a video, in which the vehicle V has been visually recognized from the left back of the vehicle V.

In this embodiment, the virtual vehicle video is a video of a virtual vehicle that moves at a first vehicle speed that is a vehicle speed of the vehicle V immediately before the vehicle V enters the tunnel T. The virtual vehicle video is generated by a size being changed according to a change in vehicle speed of the vehicle V when the vehicle V is traveling in the tunnel T. For example, when the vehicle V is traveling while maintaining the first vehicle speed, the virtual vehicle video is a video having a constant size. For example, if the vehicle V has a vehicle speed higher than the first vehicle speed, the virtual vehicle video is a video with the virtual vehicle enlarged in size as if the inter-vehicle distance has been decreased. For example, if the vehicle V has a vehicle speed lower than the first vehicle speed, the virtual vehicle video is a video with the virtual vehicle reduced in size as if the inter-vehicle distance has been increased.

The projection control unit 39 controls projection of the virtual vehicle video, such that the virtual image 200 of the virtual vehicle video generated by the virtual vehicle video generation unit 38 is visually recognized ahead of the vehicle V with use of the projection unit 20 of the HUD device 10. More particularly, based on the identification information acquired by the identification information acquisition unit 34, the projection control unit 39 outputs a video signal for projecting the virtual vehicle video, to the projection unit 20, such that the virtual image 200 of the virtual vehicle video is visually recognized ahead of the vehicle V when the tunnel T is present ahead of the vehicle V.

In this embodiment, when the vehicle V enters the tunnel T, or, in other words, when the vehicle V travels through the tunnel T, the projection control unit 39 outputs the video signal for projecting the virtual vehicle video, to the projection unit 20.

Figure 4:
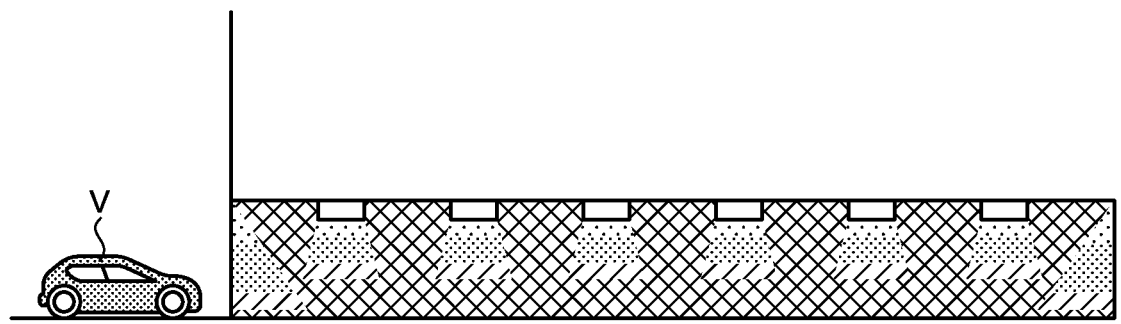
FIG. 4 is a diagram illustrating an example when a vehicle travels through a tunnel.
Figure 6:
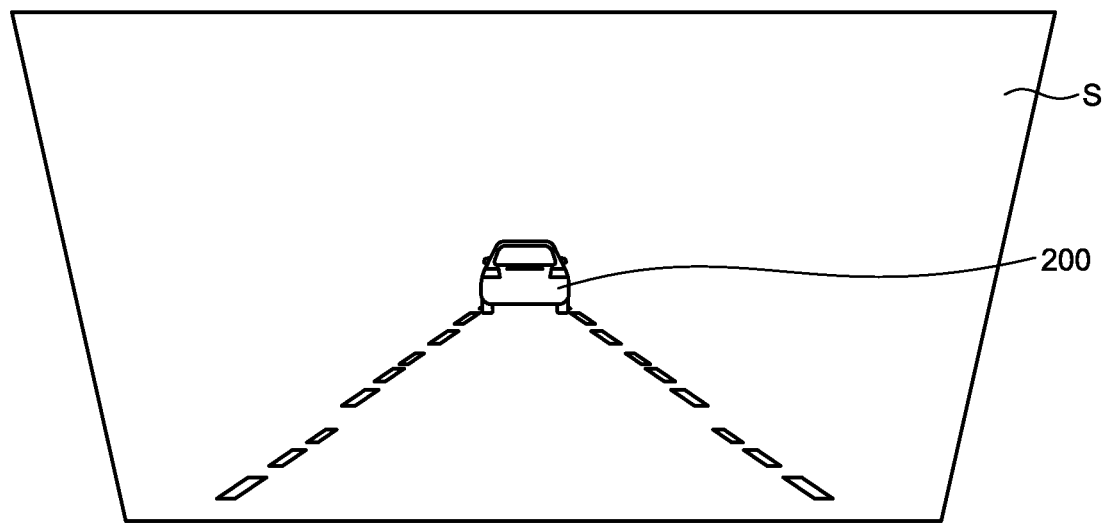
FIG. 6 is a diagram illustrating an example of the virtual image of the virtual vehicle video visually recognized by a driver when the vehicle is traveling through the tunnel.

The virtual image 200 of the virtual vehicle video projected when the tunnel T is present ahead of the vehicle V will be described by use of FIG. 4 to FIG. 6. FIG. 4 is a diagram illustrating an example when a vehicle travels through a tunnel. FIG. 5 is a diagram illustrating an example of the vehicle and a virtual image of a virtual vehicle video when the vehicle is traveling through the tunnel. FIG. 6 is a diagram illustrating an example of the virtual image of the virtual vehicle video visually recognized by a driver when the vehicle is traveling through the tunnel.

As illustrated in FIG. 4, before the vehicle V enters the tunnel T, the virtual image 200 of the virtual vehicle video is not displayed, and thus it is dark ahead and difficult for traffic lanes and tunnel side walls to be visually recognized.

Accordingly, as illustrated in FIG. 5 and FIG. 6, when the tunnel T is present ahead of the vehicle V and the vehicle V enters the tunnel T, a virtual vehicle video is projected such that the driver visually recognizes that a virtual vehicle is traveling ahead of the vehicle V by the first distance. In other words, the virtual image 200 of the virtual vehicle video is projected so as to overlap the view ahead at the first distance.

Figure 7:
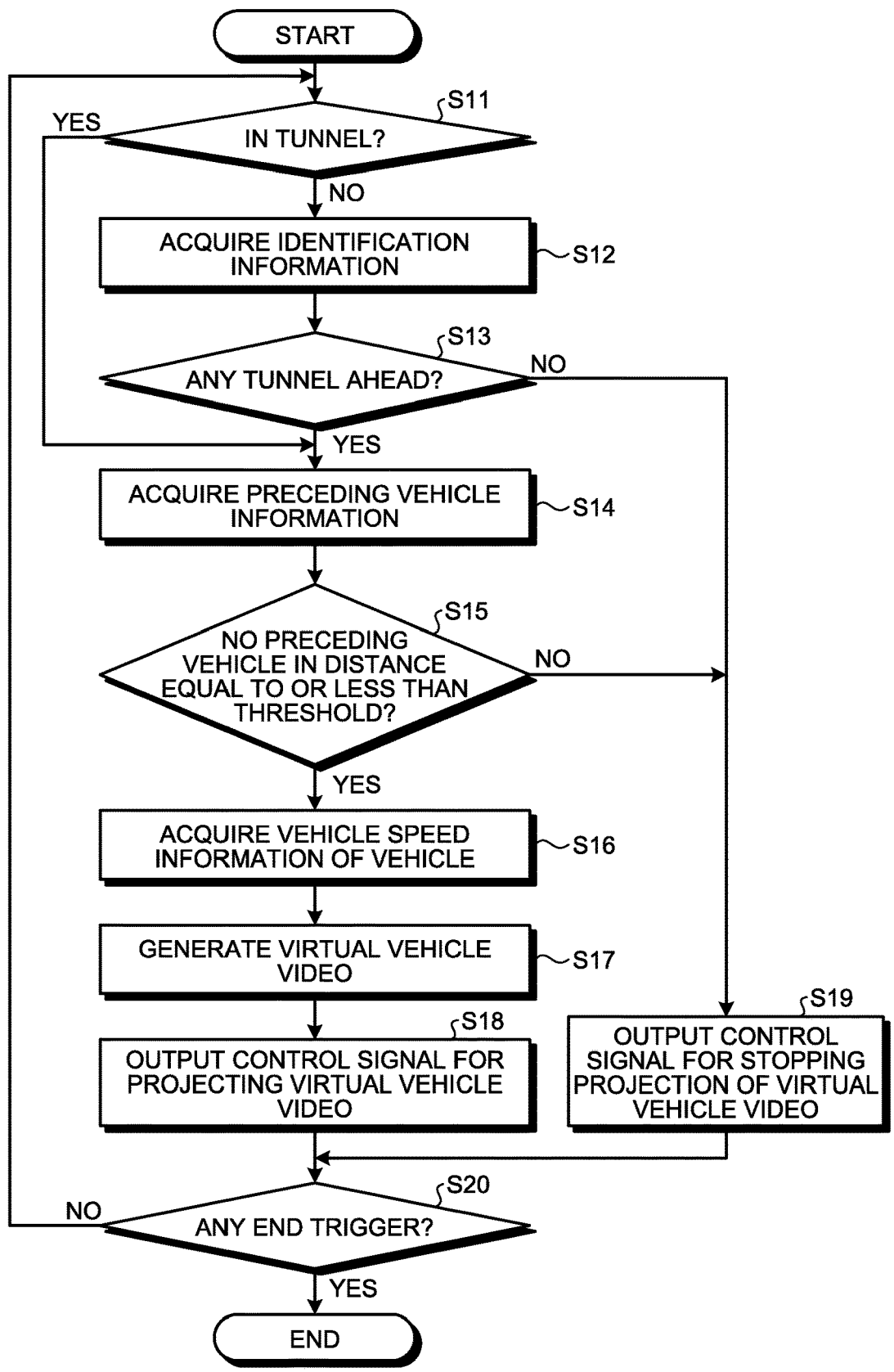
FIG. 7 is a flow chart illustrating a flow of processing in the vehicle projection control device according to the first embodiment.

Described next with use of FIG. 7 is a flow of processing in the vehicle projection control device 30. FIG. 7 is a flow chart illustrating a flow of processing in the vehicle projection control device according to the first embodiment.

The vehicle projection control device 30 determines whether or not the vehicle V is in a tunnel (Step S11). More particularly, the vehicle projection control device 30 turns an in-tunnel flag on if it has been determined, "Yes", at Step S13 described later. The initial value of the in-tunnel flag is off. If the in-tunnel flag is on, the vehicle projection control device 30 determines that the vehicle V is in a tunnel (Yes at Step S11), and proceeds to Step S14. If the in-tunnel flag is off, the vehicle projection control device 30 determines that the vehicle V is not in a tunnel (No at Step S11), and proceeds to Step S12.

If it has been determined that the vehicle V is not in a tunnel (No at Step S11), the vehicle projection control device 30 acquires identification information (Step S12). More particularly, the identification information acquisition unit 34 of the vehicle projection control device 30 acquires identification information by performing image processing on video data acquired by the video data acquisition unit 31. The vehicle projection control device 30 proceeds to Step S13.

The vehicle projection control device 30 determines whether or not a tunnel T is present ahead of the vehicle V (Step S13). The projection control unit 39 of the vehicle projection control device 30 determines that a tunnel T is present ahead of the vehicle V, if the identification information has been acquired by the identification information acquisition unit 34 (Yes at Step S13). The vehicle projection control device 30 then proceeds to Step S14. Furthermore, if it has been determined, "Yes", at Step S13, the vehicle projection control device 30 turns the in-tunnel flag on. The projection control unit 39 of the vehicle projection control device 30 determines that a tunnel T is not present ahead of the vehicle V, if identification information has not been acquired by the identification information acquisition unit 34 (No at Step S13). The vehicle projection control device 30 then proceeds to Step S19.

If it has been determined that the vehicle V is in a tunnel (Yes at Step S11), or if it has been determined that a tunnel T is present ahead of the vehicle V (Yes at Step S13), the vehicle projection control device 30 acquires preceding vehicle information (Step S14). More particularly, the preceding vehicle information acquisition unit 33 of the vehicle projection control device 30 detects an object to be captured that is a preceding vehicle positioned in a distance equal to or less than a threshold from the vehicle V, by performing image processing on video data acquired by the video data acquisition unit 31, and acquires preceding vehicle information that is a result of the detection. The vehicle projection control device 30 proceeds to Step S15.

The vehicle projection control device 30 determines whether or not a preceding vehicle is absent in the distance equal to or less than the threshold (Step S15). Based on the preceding vehicle information acquired by the preceding vehicle information acquisition unit 33, the vehicle projection control device 30 determines that a preceding vehicle is absent in the distance equal to or less than the threshold, if a preceding vehicle positioned in the distance equal to or less than the threshold from the vehicle V has not been detected (Yes at Step S15). The vehicle projection control device 30 then proceeds to Step S16. Based on the preceding vehicle information acquired by the preceding vehicle information acquisition unit 33, the vehicle projection control device 30 determines that a preceding vehicle is present in the distance equal to or less than the threshold, if a preceding vehicle positioned in the distance equal to or less than the threshold from the vehicle V has been detected (No at Step S15). The vehicle projection control device 30 then proceeds to Step S19.

If it has been determined that a preceding vehicle is absent in the distance equal to or less than the threshold (Yes at Step S15), the vehicle projection control device 30 acquires the first vehicle speed that is the immediately previous vehicle speed of the vehicle V (Step S16). More particularly, based on vehicle information acquired by the vehicle information acquisition unit 32 and stored in the internal memory, the projection control unit 39 of the vehicle projection control device 30 acquires the first vehicle speed that is a vehicle speed of the vehicle V immediately before the vehicle V enters the tunnel T.

The vehicle projection control device 30 generates a virtual vehicle video (Step S17). More particularly, based on the first vehicle speed of the vehicle V, the virtual vehicle video generation unit 38 of the vehicle projection control device 30 generates a virtual vehicle video in which a virtual vehicle travels at the first vehicle speed ahead of the vehicle V by the first distance. The vehicle projection control device 30 proceeds to Step S18.

The vehicle projection control device 30 outputs a control signal for projecting the virtual vehicle video (Step S18). More particularly, the projection control unit 39 of the vehicle projection control device 30 outputs a control signal for projecting the virtual vehicle video generated by the virtual vehicle video generation unit 38, to the projection unit 20. The vehicle projection control device 30 proceeds to Step S20.

The vehicle projection control device 30 outputs a control signal for stopping the projection of the virtual vehicle video (Step S19). More particularly, when the virtual vehicle video is being projected by the projection control unit 39, the vehicle projection control device 30 outputs a control signal for stopping the projection of the virtual vehicle video, to the projection unit 20. When the virtual vehicle video is not being projected by the projection control unit 39, the vehicle projection control device 30 maintains the state of not projecting the virtual vehicle video. The vehicle projection control device 30 proceeds to Step S20.

The vehicle projection control device 30 determines whether or not there has been an end trigger (Step S20). The end trigger is when, for example, the vehicle V has traveled a distance equal to or longer than the entire length of the tunnel T after entering the tunnel T. Alternatively, the end trigger is when, for example, a button for ending display of the virtual vehicle video has been pushed, or the vehicle has stopped. If there has been an end trigger, the vehicle projection control device 30 determines that the projection of the virtual vehicle video is to be ended (Yes at Step S20), and ends processing. If there has not been an end trigger, the vehicle projection control device 30 determines that the projection of the virtual vehicle video is not to be ended (No at Step S20), and executes the processing at Step S11 again.

In this manner, the vehicle projection control device 30 projects a virtual vehicle video such that the virtual image 200 of the virtual vehicle video is visually recognized only when the vehicle V is traveling through the tunnel T. When the vehicle V is not traveling through the tunnel T, the vehicle projection control device 30 does not project a virtual vehicle video.

As described above, according to this embodiment, only when the vehicle V is traveling through the tunnel T, a virtual vehicle video is projected such that the virtual image 200 of the virtual vehicle video is visually recognized. In this embodiment, when the vehicle V is not traveling through the tunnel T, a virtual vehicle video is not projected. According to this embodiment, the shape of the road ahead is thus able to be recognized from the virtual image 200 of the virtual vehicle video in the tunnel T. According to this embodiment, the driver is thus able to be assisted such that it becomes easier for the driver to drive in the tunnel T. According to this embodiment, since visual recognition is done like when there is a preceding vehicle ahead, the driver is less likely to get an oppressive feeling from the tunnel side walls even in the tunnel T.

According to this embodiment, a virtual vehicle video is projected such that the virtual image 200 of the virtual vehicle video is visually recognized. According to this embodiment, even when a preceding vehicle is not present ahead of the vehicle V, the vehicle V is able to travel so as to follow a virtual vehicle like when a preceding vehicle is present.

On the contrary, in a case where a preceding vehicle is not present upon traveling through the tunnel T and a virtual vehicle video is not projected, positions of the traffic lanes and tunnel side walls are difficult to be recognized. Therefore, in traveling through the tunnel T, more attention is required to be paid to driving, and the degree of fatigue is increased.

According to this embodiment, even when positions of traffic lanes and tunnel side walls are difficult to be recognized, by traveling so as to follow a virtual vehicle, one is able to be easily prevented from straying from a traffic lane or going too close to a tunnel side wall. In this way, according to this embodiment, the degree of fatigue in traveling through the tunnel T is able to be reduced.

In this embodiment, the virtual image 200 of a virtual vehicle video, which travels at the first vehicle speed of the vehicle V immediately before the vehicle V enters the tunnel T, is projected. By visually recognizing the virtual image 200 of the virtual vehicle video, the driver is able to travel by following a virtual vehicle that travels at the first vehicle speed. According to this embodiment, when the vehicle V travels through the tunnel T, the driver is able to be assisted in traveling with the vehicle speed of the vehicle V being maintained at the first vehicle speed. As described above, according to the embodiment, the vehicle V is less likely to unintentionally decelerate when the vehicle V travels through the tunnel T.

In this embodiment, when a preceding vehicle is not present in a distance equal to or less than the threshold, a virtual vehicle video is projected. Furthermore, when a preceding vehicle starts to be present in the distance equal to or less than the threshold when the virtual vehicle video is being projected, the projection of the virtual vehicle video is stopped. With this configuration according to this embodiment, a virtual vehicle video is thus able to be projected only when a preceding vehicle is not present. According to this embodiment, reduction in visibility due to overlap between a preceding vehicle and the virtual image 200 of a virtual vehicle video is able to be avoided.

Second Embodiment

Figure 8:
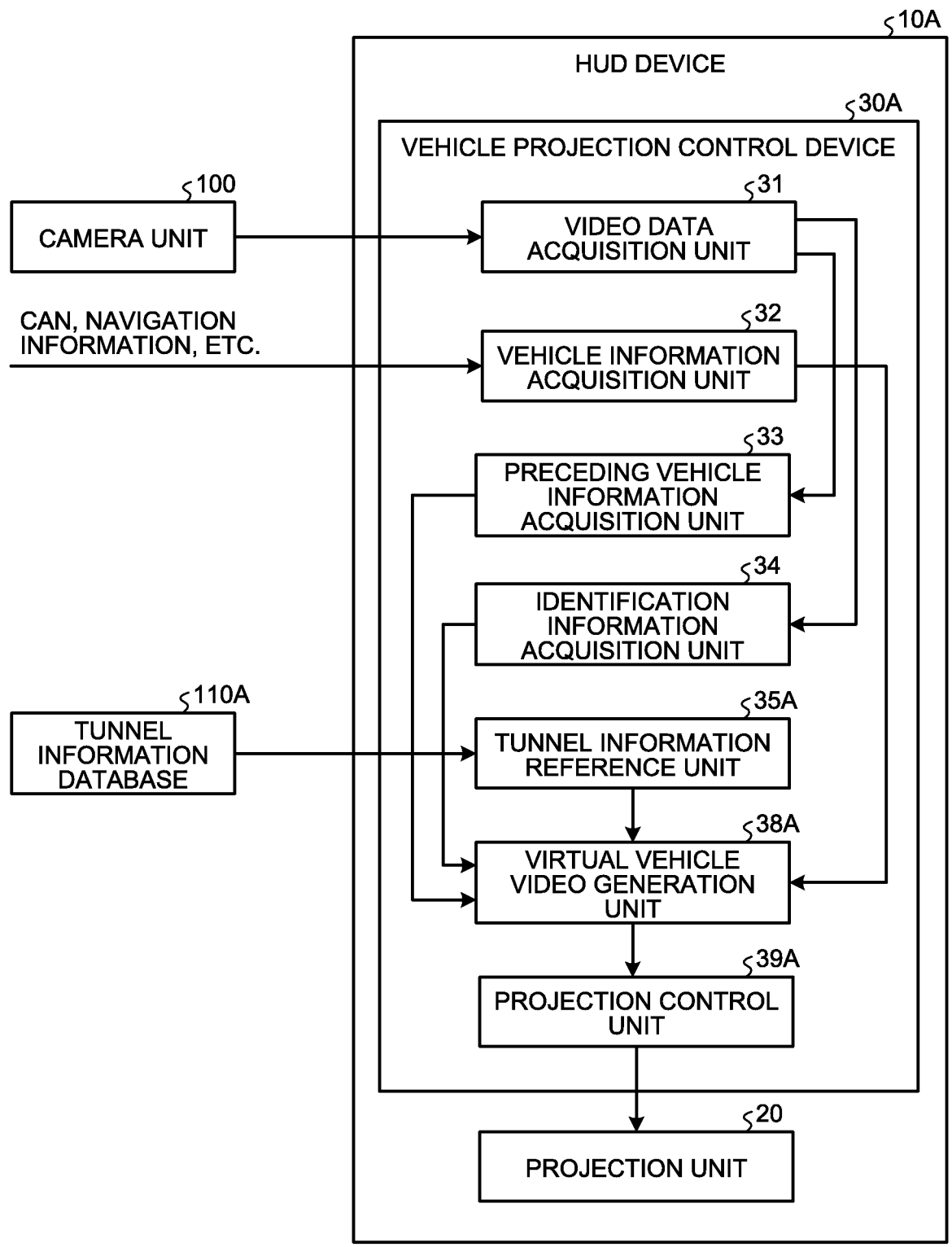
FIG. 8 is a block diagram illustrating an example of a configuration of a vehicle projection control device according to a second embodiment.
Figure 9:
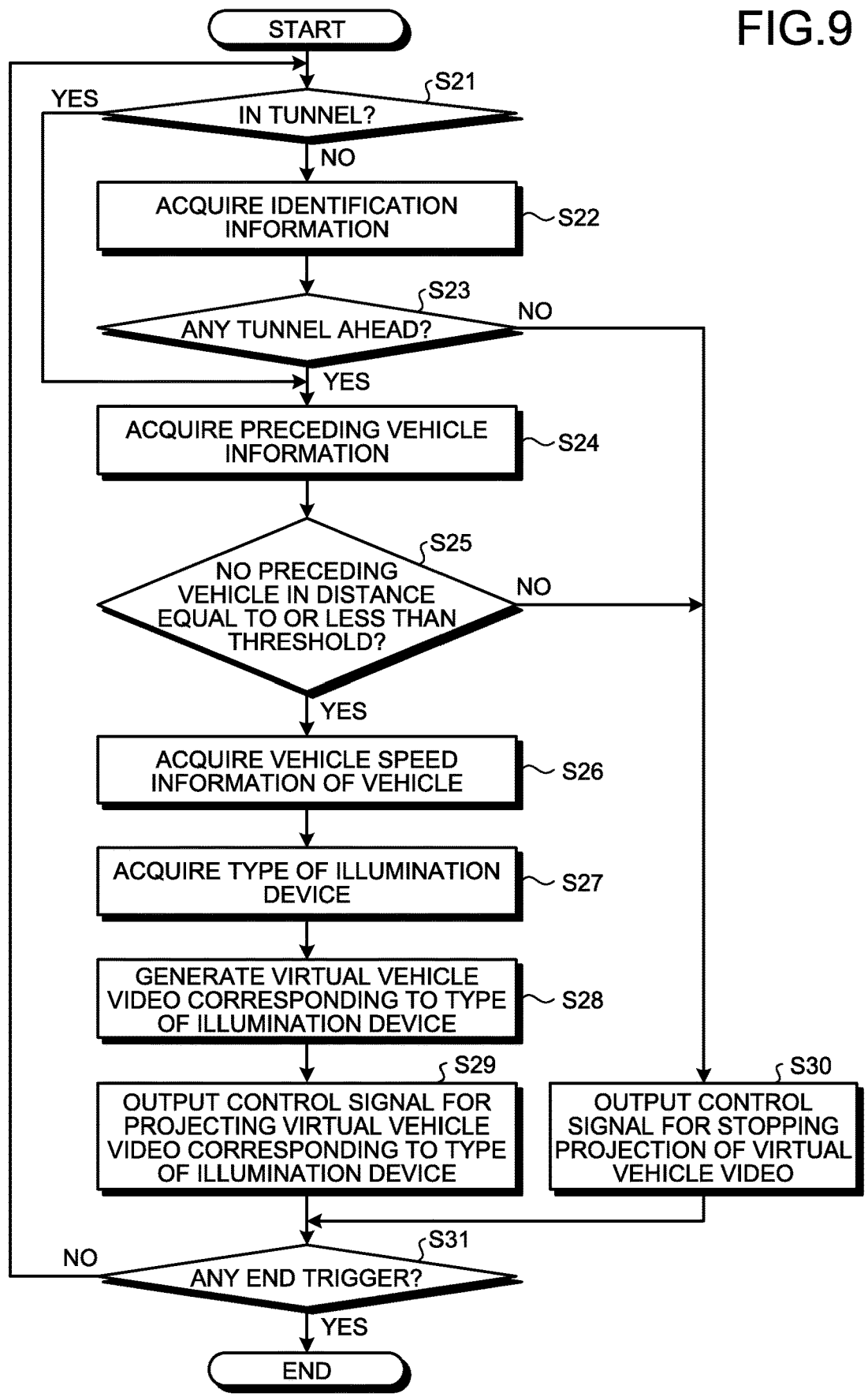
FIG. 9 is a flow chart illustrating a flow of processing in the vehicle projection control device according to the second embodiment.

Described while reference is made to FIG. 8 and FIG. 9 is an HUD device 10A according to a second embodiment. FIG. 8 is a block diagram illustrating an example of a configuration of a vehicle projection control device according to the second embodiment. FIG. 9 is a flow chart illustrating a flow of processing in the vehicle projection control device according to the second embodiment. The HUD device 10A has a basic configuration that is similar to that of the HUD device 10 according to the first embodiment. In the following description, any component that is similar to that of the HUD device 10 will be assigned with the same reference sign or a corresponding reference sign, and detailed description thereof will be omitted.

A tunnel information database 110A stores therein tunnel information including types of illumination devices in tunnels T. In this embodiment, the tunnel information database 110A stores therein, for each tunnel T, a tunnel name, positional information on the tunnel T, the entire length of the tunnel T, and the type of illumination devices therein.

The type of illumination devices is the light source type of the illumination devices. The light source type is, for example, sodium lamp, or white light emitting diode (LED). A sodium lamp emits orange light. A white LED has brightness that is more uniform than that of the sodium lamp.

A tunnel information reference unit 35A refers to tunnel information from the tunnel information database 110A. The tunnel information reference unit 35A outputs the tunnel information referred to, to a virtual vehicle video generation unit 38A.

When a tunnel T is present ahead of a vehicle V thereof, the virtual vehicle video generation unit 38A generates a virtual vehicle video having at least one of luminance and color changed according to the type of illumination devices in the tunnel T, based on the tunnel information referred to by the tunnel information reference unit 35A. If, for example, the light source type is sodium lamp, the virtual vehicle video generation unit 38A performs control such that luminance of a display video projected by the projection unit 20 is changed so that visibility of a virtual image 200 is not reduced even under the orange illumination light. If, for example, the light source type is white LED, the virtual vehicle video generation unit 38A performs control such that luminance of a display video projected by the projection unit 20 is changed so that visibility of the virtual image 200 is not reduced even under illumination light of the white LED.

When a tunnel T is present ahead of the vehicle V, a projection control unit 39A outputs, to the projection unit 20, a video signal for projecting the virtual vehicle video having at least one of luminance and color changed according to the type of illumination devices in the tunnel T, based on the tunnel information referred to by the tunnel information reference unit 35A.

Described next by use of FIG. 9 is a flow of processing in a vehicle projection control device 30A. In processing at Step S21 to Step S26, Step S30, and Step S31 in a flow chart illustrated in FIG. 9, processing similar to the processing at Step S11 to Step S16, Step S19, and Step S20 in the flow chart illustrated in FIG. 7 is performed.

The vehicle projection control device 30A acquires a type of illumination devices (Step S27). More particularly, the vehicle projection control device 30A acquires the type of illumination devices in the tunnel T ahead of the vehicle V, based on the tunnel information acquired by the tunnel information reference unit 35A. The vehicle projection control device 30A proceeds to Step S28.

The vehicle projection control device 30A generates a virtual vehicle video corresponding to the type of the illumination devices (Step S28). More particularly, the virtual vehicle video generation unit 38A of the vehicle projection control device 30A generates a virtual vehicle video having at least one of luminance and color changed therein according to the type of the illumination devices. The vehicle projection control device 30A proceeds to Step S29.

The vehicle projection control device 30A outputs a control signal for projecting the virtual vehicle video corresponding to the type of the illumination devices (Step S29). More particularly, the projection control unit 39A of the vehicle projection control device 30A outputs a control signal for projecting the virtual vehicle video having at least one of the luminance and color changed according to the type of the illumination devices, to the projection unit 20. The vehicle projection control device 30A proceeds to Step S31.

As described above, in the embodiment, generated is a virtual vehicle video having at least one of luminance and color changed therein according to the type of the illumination devices in the tunnel T. According to the embodiment, a virtual vehicle video, which is visually recognized easily regardless of the type of the illumination devices in the tunnel T, is able to be projected.

Third Embodiment

Figure 10:
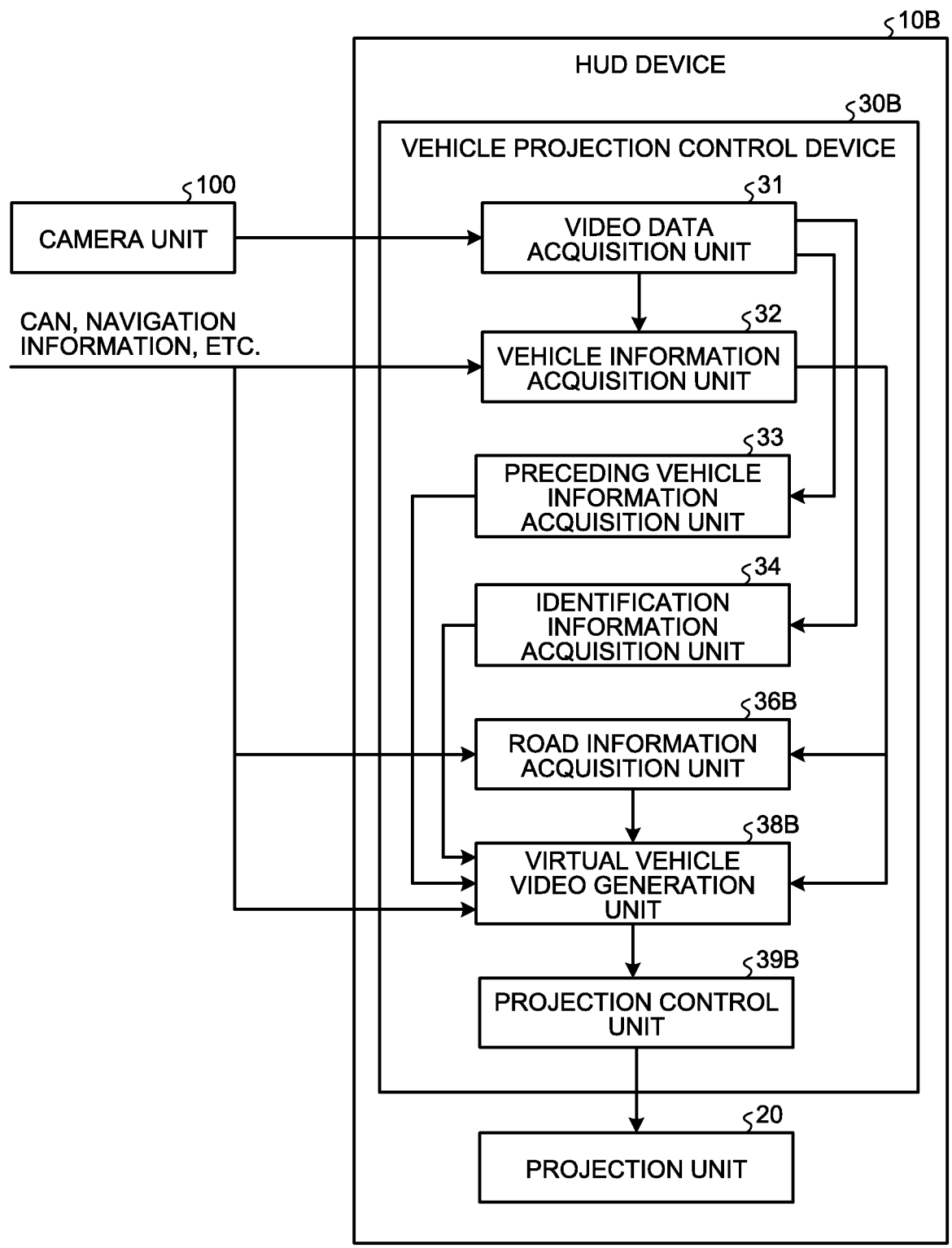
FIG. 10 is a block diagram illustrating an example of a configuration of a vehicle projection control device according to a third embodiment.
Figure 11:
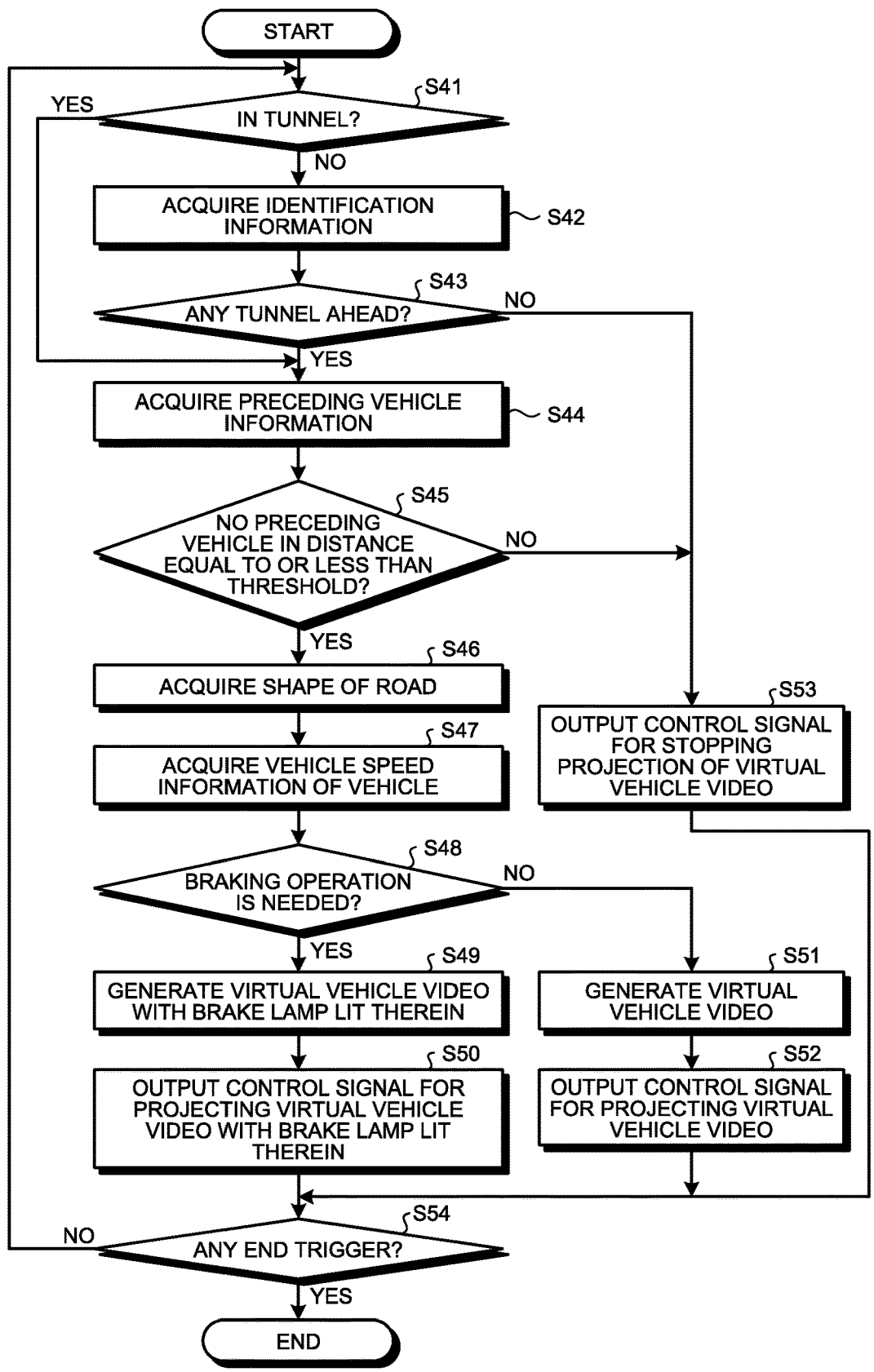
FIG. 11 is a flow chart illustrating a flow of processing in the vehicle projection control device according to the third embodiment.

Described while reference is made to FIG. 10 and FIG. 11 is an HUD device 10B according to a third embodiment. FIG. 10 is a block diagram illustrating an example of a configuration of a vehicle projection control device according to the third embodiment. FIG. 11 is a flow chart illustrating a flow of processing in the vehicle projection control device according to the third embodiment. The HUD device 10B has a basic configuration similar to that of the HUD device 10 according to the first embodiment.

When a vehicle V of the vehicle projection control device 30B is traveling in a tunnel T and the vehicle V is in need of braking operation, a vehicle projection control device 30B projects a virtual vehicle video such that a virtual image 200 of the virtual vehicle video in a display mode in which a virtual vehicle can be recognized as being in braking operation is visually recognized. In this embodiment, the display mode in which the virtual vehicle can be recognized as being in braking operation is a display mode of the virtual vehicle video, in which a brake lamp is lit. The vehicle projection control device 30B has a road information acquisition unit 36B.

The vehicle V being in need of braking operation means that the vehicle V needs to decelerate. For example, that is when the road ahead of the vehicle V is downhill, or sharply curved. For example, that is when the vehicle speed of the vehicle V has become faster than a first vehicle speed by a threshold or more.

Based on vehicle information acquired by the vehicle information acquisition unit 32, and navigation information acquired by a navigation system, the road information acquisition unit 36B acquires road information indicating a shape of the road ahead of the vehicle V. More particularly, based on current position information of the vehicle V and the navigation information, the road information acquisition unit 36B acquires road information indicating a shape of the road ahead of the vehicle V.

When the vehicle V is traveling in a tunnel T and the vehicle V is in need of braking operation, based on at least one of identification information acquired by the identification information acquisition unit 34, the vehicle information acquired by the vehicle information acquisition unit 32, and the navigation information acquired from the navigation system; a virtual vehicle video generation unit 38B generates a virtual vehicle video in which a brake lamp is lit, which is in a display mode in which a virtual image can be recognized as being in braking operation.

When the vehicle V is traveling in the tunnel T and the vehicle V is in need of braking operation, based on at least one of identification information acquired by the identification information acquisition unit 34, the vehicle information acquired by the vehicle information acquisition unit 32, and the navigation information acquired from the navigation system; a projection control unit 39B outputs a video signal, which is for projecting the virtual vehicle video generated by the virtual vehicle video generation unit 38B, to the projection unit 20, such that the virtual image 200 of the virtual vehicle video in which the brake lamp has been lit is visually recognized, which is in the display mode in which the virtual image can be recognized as being in braking operation.

Described next by use of FIG. 11 is a flow of processing in the vehicle projection control device 30B. In processing at Step S41 to Step S45, Step S47, and Step S51 to Step S54 in a flow chart illustrated in FIG. 11, processing similar to the processing at Step S11 to Step S15, Step S16, and Step S17 to Step S20 in the flow chart illustrated in FIG. 7 is performed.

If it has been determined that a preceding vehicle is absent in a distance equal to or less than a threshold (Yes at Step S45), the vehicle projection control device 30B acquires a shape of a road (Step S46). More particularly, the vehicle projection control device 30B acquires a shape of the road ahead of the vehicle V, based on road information acquired by the road information acquisition unit 36B. The vehicle projection control device 30B proceeds to Step S47.

The vehicle projection control device 30B determines whether or not braking operation is needed (Step S48). Based on the vehicle information acquired by the vehicle information acquisition unit 32 and the road information acquired by the road information acquisition unit 36B, the vehicle projection control device 30B determines that braking operation is needed when the road ahead of the vehicle V is downhill, or sharply curved (Yes at Step S48). Alternatively, based on the vehicle information, the vehicle projection control device 30B determines that braking operation is needed if the vehicle speed of the vehicle V has become higher than the first vehicle speed by a threshold or more (Yes at Step S48). The vehicle projection control device 30B then proceeds to Step S49. If the road ahead of the vehicle V is not downhill, is not sharply curved, and the vehicle speed of the vehicle V is not higher than the first vehicle speed by the threshold or more, the vehicle projection control device 30B determines that braking operation is not needed (No at Step S48). The vehicle projection control device 30B then proceeds to Step S51.

The vehicle projection control device 30B generates a virtual vehicle video in which a brake lamp is lit (Step S49). More particularly, based on the first vehicle speed of the vehicle V, the virtual vehicle video generation unit 38B of the vehicle projection control device 30B generates a virtual vehicle video, in which a virtual vehicle travels at a speed lower than the first vehicle speed of the vehicle V ahead of the vehicle V by the first distance and a brake lamp is lit.

The vehicle projection control device 30B outputs a control signal for projecting the virtual vehicle video in which the brake lamp is lit (Step S50). More particularly, the projection control unit 39B of the vehicle projection control device 30B outputs a control signal for projecting the virtual vehicle video generated by the virtual vehicle video generation unit 38B and having the brake lamp lit therein, to the projection unit 20. The vehicle projection control device 30B proceeds to Step S54.

As described above, in this embodiment, when braking operation is needed, a virtual vehicle video, in which a brake lamp is lit, is projected. According to this embodiment, by the brake lamp being lit in the virtual vehicle video, the driver is able to perform braking operation of the driver's own vehicle V naturally. According to this embodiment, the driver is able to be assisted in performing appropriate braking operation, and the driver's own vehicle V is able to be assisted in traveling at an appropriate vehicle speed.

Fourth Embodiment

Figure 12:
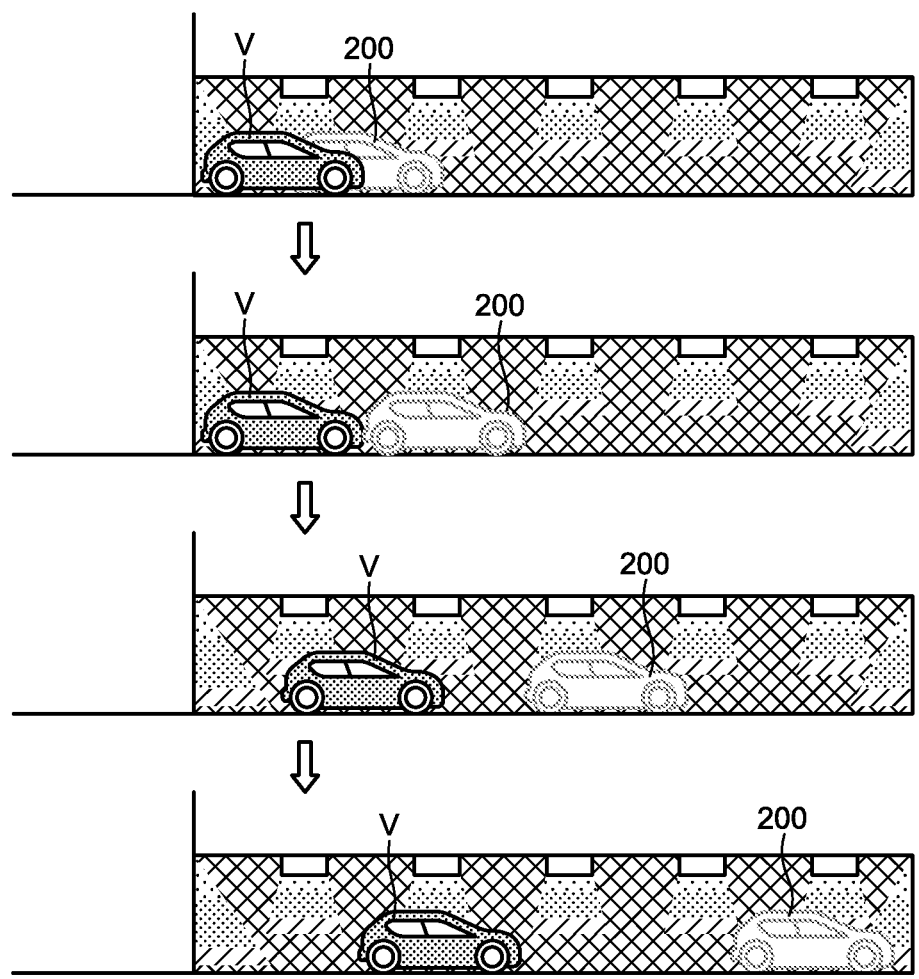
FIG. 12 is a diagram illustrating processing in a vehicle projection control device according to a fourth embodiment, the diagram illustrating an example of when a tunnel is present ahead of a vehicle of the vehicle projection control device.

Described while reference is made to FIG. 12 is an HUD device 10 according to a fourth embodiment. FIG. 12 is a diagram illustrating processing in a vehicle projection control device according to the fourth embodiment, the diagram illustrating an example of when a tunnel is present ahead of a vehicle of the vehicle projection control device. The HUD device 10 has a basic configuration similar to that of the HUD device 10 according to the first embodiment.

The virtual vehicle video generation unit 38 generates a virtual vehicle video, in which a virtual vehicle separates away from the vehicle V to a first distance ahead of the vehicle V from near the vehicle V. In this embodiment, the virtual vehicle video generation unit 38 generates a virtual vehicle video that is visually recognized by a driver as if a virtual vehicle comes out from the vehicle V forward by separating from the vehicle V.

When a tunnel T is present ahead of the vehicle V based on identification information acquired by the identification information acquisition unit 34, the projection control unit 39 projects a virtual vehicle video, which is generated by the virtual vehicle video generation unit 38 and is visually recognized as if a virtual vehicle separates away from the vehicle V to the first distance ahead of the vehicle V from near the vehicle V. In this embodiment, when a tunnel T is present ahead of the vehicle V, the projection control unit 39 projects a virtual vehicle video that is visually recognized as if a virtual image 200 of the virtual vehicle video comes out from the vehicle V forward by separating from the vehicle V.

The virtual image 200 of the virtual vehicle video projected when the tunnel T is present ahead of the vehicle V will be described by use of FIG. 12. The virtual image 200 of the virtual vehicle video is visually recognized as if traveling near the vehicle V immediately after the vehicle V enters the tunnel T. As time proceeds, or in other words, as the vehicle V travels, the virtual image 200 of the virtual vehicle video is visually recognized as if going away from the vehicle V. When a predetermined time period elapses from projection of the virtual vehicle video, the virtual image 200 of the virtual vehicle video is visually recognized as if traveling at the first distance ahead.

As described above, in this embodiment, when the tunnel T is present ahead of the vehicle V, the virtual image 200 of the virtual vehicle video, in which the virtual image 200 separates away from the vehicle V to the first distance ahead of the vehicle V from near the vehicle V, is projected. According to this embodiment, the driver is able to recognize more easily that the virtual image 200 of the virtual vehicle video has been projected.

The HUD devices 10 according to the embodiments have been described thus far, but the HUD devices 10 may be implemented in various different modes other than the above described embodiments.

Each component of the HUD devices 10 are functionally and/or conceptually illustrated in the drawings, and is not necessarily configured physically as illustrated in the drawings. That is, the specific mode of each device is not limited to the one illustrated in the drawings, and all or a part of each device may be functionally or physically separated or integrated in any units according to the processing load and the use situations of the device.

A configuration of the HUD devices 10 is realized as, for example, software, by a program or the like loaded into a memory. According to the above description of the embodiments, the HUD devices 10 are each configured as functional blocks realized by cooperation of these pieces of hardware or software. That is, these functional blocks may be realized in any of various forms, by hardware only, software only, or a combination of hardware and software.

The above described components include those that are easily expected by persons skilled in the art, and those that are substantially the same. Furthermore, the above described configurations may be combined as appropriate. Moreover, without departing from the spirit of the present invention, various omissions, substitutions, or modifications of the configurations are possible.

The vehicle projection control device 30 has been described to acquire current position information of its own vehicle V from the navigation system, but the acquisition is not limited to this example. The vehicle projection control device 30 may include a current position information acquisition unit that acquires current position information of its own vehicle V acquired by a global positioning system (GPS) receiver installed in the vehicle.

The virtual moving body video generation unit has been described as the virtual vehicle video generation unit 38, but the virtual moving body video generation unit is not limited to this example. A video generated by the virtual moving body video generation unit may be of a virtual moving body that moves at the first vehicle speed ahead of its own vehicle V. For example, the virtual moving body may be a circle, or an icon indicating the moving direction and having an arrow shape or a round shape.

The identification information acquisition unit 34 has been described as the character recognition unit, but the identification information acquisition unit 34 may acquire information identifying the tunnel T, the information being, for example, a two-dimensional code, a drawing pattern, or information provided from the road around the entrance of the tunnel T.

Without using a combiner, the projection unit 20 may cause a display video projected on the projector 21 to be reflected by the windshield S and visually recognized by the driver as a virtual image.

When it has been determined that the amount of change in speed of a vehicle V thereof relative to the first vehicle speed is equal to or larger than a threshold, a virtual vehicle video in a display mode, in which the change in speed of the vehicle V can be checked, may be generated. For example, if the vehicle V has a vehicle speed higher than the first vehicle speed, the virtual vehicle video may be, for example, a video having the color of the body of the virtual vehicle therein changed to red. If the vehicle V has a vehicle speed lower than the first vehicle speed, the virtual vehicle video may be, for example, a video, in which the body of the virtual vehicle is made to blink, or the color of the body is made pale.

When a tunnel T is present ahead of the vehicle V, the virtual vehicle video generation unit 38A may generate a virtual vehicle video having at least one of luminance and color changed according to the illuminance pattern in the tunnel T. Described below is the illuminance pattern in the tunnel T. The tunnel T has illumination devices arranged therein at intervals. The illuminance at the exit and entrance of the tunnel T is higher than the illuminance in an intermediate portion of the tunnel T. In other words, the exit and entrance of the tunnel T are brighter than the intermediate portion of the tunnel T. This is for better adaptation to the change from the brightness outside the tunnel T to the brightness inside the tunnel T. In the intermediate portion of the tunnel T, the illuminance below the illumination devices is high, and this illuminance decreases as the distance from below the illumination devices increases. In the intermediate portion of the tunnel T, places high in illuminance and places low in illuminance exist alternately, correspondingly to the installation intervals between the illumination devices. A virtual vehicle video having at least one of luminance and color changed according to such an illuminance pattern in the tunnel T may thus be generated.

An embodiment provides an effect of being able to assist in facilitating driving in traveling through tunnels.

What is claimed is:

1. A vehicle projection control device, comprising:
    a vehicle information acquisition unit configured to acquire vehicle information including a vehicle speed of a vehicle;
    an identification information acquisition unit configured to acquire identification information identifying a tunnel through which the vehicle travels;
    a virtual moving body video generation unit configured to generate a virtual moving body video of a virtual moving body that moves ahead of the vehicle in a direction that is the same as the vehicle, the virtual moving body video being for projection by a projection unit of a head-up display device; and
    a projection control unit configured to control projection of the virtual moving body video, such that a virtual image of the virtual moving body video generated by the virtual moving body video generation unit is visually recognized ahead of the vehicle with use of the projection unit of the head-up display device, wherein
    the virtual moving body video generation unit is configured to generate the virtual moving body video in a display mode in which a change in speed of the vehicle is able to be checked by changing a size of the virtual moving body according to the change in the speed of the vehicle, when it has been determined, based on the vehicle information acquired by the vehicle information acquisition unit, that an amount of change in the speed of the vehicle relative to a speed of the vehicle immediately before the vehicle enters the tunnel is equal to or larger than a threshold,
    the projection control unit is configured to control the projection of the virtual moving body video based on the identification information acquired by the identification information acquisition unit,
    the projection control unit is configured to control the projection of the virtual moving body video as if the virtual moving body is moving ahead of the vehicle at the speed of the vehicle immediately before the vehicle enters the tunnel, and
    the projection control unit controls the projection of the virtual moving body video, such that the virtual image of the virtual moving body video in the display mode that the change in the speed of the vehicle is able to be checked, which is generated by the virtual moving body video generation unit, is visually recognized ahead of the vehicle, when it has been determined, based on the vehicle information acquired by the vehicle information acquisition unit, that the amount of change in the speed of the vehicle relative to the speed of the vehicle immediately before the vehicle enters the tunnel is equal to or larger than the threshold.

2. The vehicle projection control device according to claim 1, comprising:
    a tunnel information reference unit configured to refer to a tunnel information database storing therein tunnel information including a type of an illumination device in the tunnel, wherein
    the virtual moving body video generation unit is configured to generate, based on the tunnel information referred to by the tunnel information reference unit, the virtual moving body video having at least one of luminance or color changed therein according to the type of the illumination device in the tunnel when the vehicle travels through the tunnel, and
    the projection control unit is configured to control the projection of the virtual moving body video, such that the virtual image of the virtual moving body video is visually recognized, the virtual moving body video having been generated by the virtual moving body video generation unit by changing at least one of the luminance or color according to the type of the illumination device in the tunnel based on the tunnel information referred to by the tunnel information reference unit.

3. The vehicle projection control device according to claim 1, wherein the identification information acquisition unit is a character recognition unit configured to recognize a character included, as an object to be captured, in front video data captured by a front camera that captures an image ahead of the vehicle.

4. The vehicle projection control device according to claim 1, wherein
    the virtual moving body video generation unit is configured to generate the virtual moving body video in a display mode in which the virtual moving body is able to be recognized as being in braking operation, when the vehicle is traveling in the tunnel and the braking operation is determined to be needed, based on at least one of the identification information acquired by the identification information acquisition unit, the vehicle information acquired by the vehicle information acquisition unit, and navigation information acquired from a navigation system, the navigation information including information on a road traveled by the vehicle, and the projection control unit is configured to control the projection of the virtual moving body video, such that the virtual image of the virtual moving body video in the display mode in which the virtual moving body is able to be recognized as being in braking operation, which is generated by the virtual moving body video generation unit, is visually recognized ahead of the vehicle, when the vehicle is traveling in the tunnel and the braking operation is determined to be needed, based on at least one of the identification information acquired by the identification information acquisition unit, the vehicle information acquired by the vehicle information acquisition unit, or the navigation information acquired from the navigation system, the navigation information including the information on the road traveled by the vehicle.

5. A head-up display device, comprising:
the vehicle projection control device according to claim 1; and
the projection unit.

6. A vehicle projection control method, comprising:
acquiring vehicle information including a vehicle speed of a vehicle;
acquiring identification information identifying a tunnel through which the vehicle travels;
generating a virtual moving body video of a virtual moving body that moves ahead of the vehicle in a direction that is the same as the vehicle, the virtual moving body video being for projection by a projection unit of a head-up display device; and
controlling the projection of the virtual moving body video, such that a virtual image of the virtual moving body video generated at the generating the virtual moving body video is visually recognized ahead of the vehicle with use of the projection unit of the head-up display device, wherein
the generating includes generating the virtual moving body video in a display mode in which a change in speed of the vehicle is able to be checked by changing a size of the virtual moving body according to the change in the speed of the vehicle, when it has been determined, based on the vehicle information acquired by the acquiring of the vehicle information, that an amount of change in the speed of the vehicle relative to a speed of the vehicle immediately before the vehicle enters the tunnel is equal to or larger than a threshold,
the controlling the projection of the virtual moving body video includes controlling the projection of the virtual moving body video based on the identification information acquired at the acquiring of the identification information,
the controlling the projection of the virtual moving body video includes controlling the projection of the virtual moving body video as if the virtual moving body is moving ahead of the vehicle at the speed of the vehicle immediately before the vehicle enters the tunnel, and
the controlling the projection of the virtual moving body video includes controlling the projection of the virtual moving body video, such that the virtual image of the generated virtual moving body video in the display mode that the change in the speed of the vehicle is able to be checked is visually recognized ahead of the vehicle, when it has been determined, based on the vehicle information acquired by the acquiring of the vehicle information, that the amount of change in the speed of the vehicle relative to the speed of the vehicle immediately before the vehicle enters the tunnel is equal to or larger than the threshold.

7. A non-transitory computer-readable medium containing a program that causes a computer, which operates as a vehicle projection control device, to execute:
acquiring vehicle information including a vehicle speed of a vehicle;
acquiring identification information identifying a tunnel through which the vehicle travels;
generating a virtual moving body video of a virtual moving body that moves ahead of the vehicle in a direction that is the same as the vehicle, the virtual moving body video being for projection by a projection unit of a head-up display device; and
controlling the projection of the virtual moving body video, such that a virtual image of the virtual moving body video generated at the generating the virtual moving body video is visually recognized ahead of the vehicle with use of the projection unit of the head-up display device, wherein
the generating includes generating the virtual moving body video in a display mode in which a change in speed of the vehicle is able to be checked by changing a size of the virtual moving body according to the change in the speed of the vehicle, when it has been determined, based on the vehicle information acquired by the acquiring of the vehicle information, that an amount of change in the speed of the vehicle relative to a speed of the vehicle immediately before the vehicle enters the tunnel is equal to or larger than a threshold,
the controlling the projection of the virtual moving body video includes controlling the projection of the virtual moving body video based on the identification information acquired at the acquiring of the identification information,
the controlling the projection of the virtual moving body video includes controlling the projection of the virtual moving body video as if the virtual moving body is moving ahead of the vehicle at the speed of the vehicle immediately before the vehicle enters the tunnel, and
the controlling the projection of the virtual moving body video includes controlling the projection of the virtual moving body video, such that the virtual image of the generated virtual moving body video in the display mode that the change in the speed of the vehicle is able to be checked is visually recognized ahead of the vehicle, when it has been determined, based on the vehicle information acquired by the acquiring of the vehicle information, that the amount of change in the speed of the vehicle relative to the speed of the vehicle immediately before the vehicle enters the tunnel is equal to or larger than the threshold.

* * * * *